(12) United States Patent
Bouchier et al.

(10) Patent No.: US 10,520,730 B2
(45) Date of Patent: Dec. 31, 2019

(54) METHODS AND SYSTEMS FOR AUGMENTED REALITY

(71) Applicant: Essilor International, Charenton le Pont (FR)

(72) Inventors: Aude Bouchier, Charenton le Pont (FR); Jean-Paul Cano, Charenton le Pont (FR); Gilles Le Saux, Charenton le Pont (FR)

(73) Assignee: Essilor International, Charenton le Pont (FR)

( * ) Notice: Subject to any disclaimer, the term of this patent is extended or adjusted under 35 U.S.C. 154(b) by 475 days.

(21) Appl. No.: 14/916,905

(22) PCT Filed: Sep. 3, 2014

(86) PCT No.: PCT/EP2014/068758
§ 371 (c)(1),
(2) Date: Mar. 4, 2016

(87) PCT Pub. No.: WO2015/032828
PCT Pub. Date: Mar. 12, 2015

(65) Prior Publication Data
US 2016/0216515 A1 Jul. 28, 2016

(30) Foreign Application Priority Data
Sep. 4, 2013 (EP) .................................. 13306208

(51) Int. Cl.
*G02B 27/01* (2006.01)
*G03H 1/08* (2006.01)
(Continued)

(52) U.S. Cl.
CPC ......... *G02B 27/0172* (2013.01); *G02C 7/027* (2013.01); *G03H 1/0808* (2013.01);
(Continued)

(58) Field of Classification Search
CPC ........ G02B 27/0172; G02B 2027/0178; G02B 2027/0174; G02B 2027/014;
(Continued)

(56) References Cited

U.S. PATENT DOCUMENTS

2006/0082874 A1\* 4/2006 Anderson ............... G09F 9/302
359/443
2008/0088937 A1\* 4/2008 Tang ................... G02B 27/0172
359/630
(Continued)

FOREIGN PATENT DOCUMENTS

JP 2004-147063 A 5/2004
JP 2006-208687 A 8/2006
(Continued)

OTHER PUBLICATIONS

K. Meano et al., "Electro-Holographic Display using 15 Mega Pixels LCD", Proceedings of SPIE—Int'l. Society for Optical Engineering, vol. 2652, pp. 15-23, Jan. 1, 1996.
(Continued)

*Primary Examiner* — Amit Chatly
(74) *Attorney, Agent, or Firm* — Oblon, McClelland, Maier & Neustadt, L.L.P.

(57) ABSTRACT

Methods and systems for image display with a head-mounted device, wherein customization of the display is achieved by taking into account wearer-specific visualization parameters. Such visualization parameters include parameters pertaining to the design of the device and/or wearer ophthalmic data such as wearer prescription data. Preferred images are computer-generated holographic images.

15 Claims, 7 Drawing Sheets

(51) Int. Cl.
*G03H 1/22* (2006.01)
*G02C 7/02* (2006.01)
*G06T 19/00* (2011.01)
*G02C 7/08* (2006.01)
*G02C 7/14* (2006.01)

(52) U.S. Cl.
CPC ......... *G03H 1/2294* (2013.01); *G06T 19/006* (2013.01); *G02B 2027/011* (2013.01); *G02B 2027/014* (2013.01); *G02B 2027/0174* (2013.01); *G02B 2027/0178* (2013.01); *G02C 7/086* (2013.01); *G02C 7/14* (2013.01); *G02C 2202/20* (2013.01); *G03H 1/2286* (2013.01); *G03H 2001/0825* (2013.01); *G03H 2001/2284* (2013.01); *G03H 2225/60* (2013.01); *G03H 2226/04* (2013.01); *G03H 2227/02* (2013.01)

(58) Field of Classification Search
CPC . G02B 2027/011; G06T 19/006; G02C 7/027; G02C 7/14; G02C 2202/20; G02C 7/086; G03H 1/0808; G03H 1/2294; G03H 2225/60
See application file for complete search history.

(56) References Cited

U.S. PATENT DOCUMENTS

| | | | |
|---|---|---|---|
| 2010/0046070 A1* | 2/2010 | Mukawa | G02B 27/0172 359/480 |
| 2010/0271675 A1* | 10/2010 | Leister | G03H 1/08 359/9 |
| 2010/0289880 A1 | 11/2010 | Moliton et al. | |
| 2013/0223279 A1* | 8/2013 | Tinnakornsrisuphap | H04L 41/0809 370/254 |
| 2013/0241806 A1* | 9/2013 | Bathiche | G02B 27/0179 345/8 |
| 2013/0265623 A1* | 10/2013 | Sugiyama | G02B 27/0172 359/13 |
| 2013/0336631 A1* | 12/2013 | Kura | G02B 27/0172 386/230 |
| 2014/0282911 A1* | 9/2014 | Bare | G06T 19/006 726/4 |
| 2015/0355481 A1* | 12/2015 | Hilkes | G02B 27/017 351/204 |

FOREIGN PATENT DOCUMENTS

| | | |
|---|---|---|
| JP | 2007-274566 A | 10/2007 |
| JP | 2009-145646 | 7/2009 |
| JP | 2012-186659 A | 9/2012 |
| JP | 2012-195693 A | 10/2012 |
| WO | WO 2012/132289 A1 | 10/2012 |
| WO | WO 2013/057923 | 4/2013 |

OTHER PUBLICATIONS

Office Action dated Jun. 25, 2018 in corresponding Japanese Patent Application No. 2016-539532 (with English Translation), 15 pages.

* cited by examiner

| WEAR DB | | | | | | | | |
|---|---|---|---|---|---|---|---|---|
| WEAR ID | RE | | | | LE | | | |
| | P | ASTI | ADD | ... | P | ASTI | ADD | ... |
| WEAR ID 1 | - 2.00 | + 0.50 | + 0.75 | ... | - 1.50 | + 0.25 | + 0.75 | ... |
| WEAR ID 2 | - 2.25 | + 0.75 | + 0.50 | ... | - 2.50 | + 0.50 | + 0.50 | ... |
| ... | ... | ... | ... | ... | ... | ... | ... | ... |
| ... | ... | ... | ... | ... | ... | ... | ... | ... |
| ... | ... | ... | ... | ... | ... | ... | ... | ... |
| ... | ... | ... | ... | ... | ... | ... | ... | ... |
| WEAR ID n | ... | ... | ... | ... | ... | ... | ... | ... |

FIG. 10          FIG. 11

METHODS AND SYSTEMS FOR AUGMENTED REALITY

RELATED APPLICATIONS

This is a U.S. national stage application under 35 USC § 371 of International application No. PCT/EP2014/068758, filed on Sep. 3, 2014. This application claims the priority of European application no. 13306208.3 filed Sep. 4, 2013, the entire content of which is hereby incorporated by reference.

FIELD OF THE INVENTION

The invention relates to methods and systems for augmented reality.

The invention relates more particularly to the display of images, in particular holographic images, by means of a head-mounted device (HMD).

BACKGROUND OF THE INVENTION

Head-mounted devices with display features are known in the art. Such devices include so-called 'smart glasses', which allow the wearer thereof to visualize images or text for augmented reality.

In order to improve wearer visual comfort, it is desirable to provide methods and systems wherein images and text are displayed in a customized way that is specifically adapted to the wearer and/or to the worn device.

Further, in order to improve wearer ergonomic comfort, it is desirable to provide a head-mounted device that is light, compact, and in particular a device that has low energy requirements when in use.

Also, with regards to safety, certain types of electromagnetic waves used in communication for data exchange may create health issues, especially for devices located close to the head such as HMIDs. It is thus desirable to provide a head-mounted device whose functioning limits or avoids exposure of the wearer to such electromagnetic waves.

SUMMARY OF THE INVENTION

The present invention generally provides methods and systems for image display with a head-mounted device, wherein customization of the display is achieved by taking into account wearer-specific visualization parameters. Such visualization parameters include parameters pertaining to the design of the device and/or wearer ophthalmic data such as wearer prescription data. Preferred images are computer-generated holographic images. According to the invention, the quality of the display and the wearer visual experience can be enhanced by correcting image distortions due to optical aberrations. Such aberrations may result from the geometry and design of the device itself and/or from the wearer ametropia and/or presbyopia.

In preferred embodiments, the invention implements image display by means of a phase spatial light modulator (SLM). Said SLM can be selected from phase-only SLMs and phase and amplitude SLMs. Phase modulation is very advantageous in that it offers the possibility to code both image data and prescription data in the wave front, which is not possible with other regular displays that do not convey any information on the phase of the wave front. In other terms, the SLM allows to virtually code for the optical effect of a prescription lens in addition to coding for an image. Phase modulation also provides further advantages as described hereinafter.

Methods of the Invention

One aspect of the present invention provides a computer-implemented method for the processing of computer-generated image data for display with a head-mounted computer-generated image displaying device worn by a wearer, comprising:

(i) a step of providing visualization parameter data selected from wearer ophthalmic data including wearer prescription data, wearer eye sensitivity data and wearer ophthalmic biometry data; and head-mounted device data including frame data and lens data, (ii) a step of providing computer-generated image data, (iii) a step of calculating modified computer-generated image data from the computer-generated image data of step (ii) by taking into account the visualization parameter data of step (i), and (iv) a step of providing the modified computer-generated image data of step (iii) to said device for display.

Said image can be a holographic image, and/or said visualization parameter data can be wearer prescription data selected from astigmatism module, astigmatism axis, power, prism and addition.

In one embodiment, said image is a holographic image, said computer-generated image data are computer-generated holographic image data, said modified computer-generated image data are modified computer-generated holographic image data; and said method comprises:

(v) a step of emitting, by at least one light source, a light beam suitable (arranged, configured) for displaying the holographic image from the modified computer-generated holographic image data of step (iii) by illumination of said device, wherein said light source is provided on a remote lighting terminal and/or is built-in on said device.

Said light source can be provided on a remote lighting terminal, and said light source can be arranged to transmit data and:

step (ii) may comprise a step of transmitting said computer-generated holographic image data from said light source to said device, or step (iv) may comprise a step of transmitting said modified computer-generated holographic image data from said light source to said device.

In one embodiment, at least one of said visualization parameter data of step (i) are stored in a memory on said device.

In this embodiment, step (i) may comprise:

(i-a) a step of detecting, by at least one communication terminal, the presence of said wearer, (i-b) responsive to the detected presence at step (i-a), a step of transmitting said visualization parameter data from said device to said communication terminal, and step (iii) may comprise a step of transmitting modified computer-generated image data from said communication terminal to said device.

In one embodiment, at least one of said visualization parameter data of step (i) are stored in a wearer database on a communication server connected to at least one communication terminal via a communication network, in association with a visualization parameter identifier. Such identifier can be defined as an identifier that allows the retrieval of said visualization parameter data (VPD).

In this embodiment, step (i) may comprise:

(i-a) a step of detecting, by said at least one communication terminal, the presence of said wearer, (i-b) responsive to the detected presence at step (i-a), a step of transmitting said visualization parameter data from said communication server to said communication terminal, and (i-c) optionally, a further step of transmitting visualization parameter data from said communication terminal to said device.

Step (iii) may comprise:

a step of transmitting modified computer-generated image data from said communication terminal to said device, and optionally, a prior step of transmitting modified computer-generated image data from said communication server to said communication terminal.

In one embodiment, said computer-generated image data or said modified computer-generated image data are stored in an image database, wherein said method comprises a preliminary step of pre-registering, in said database, an association between a wearer identifier and said wearer, and wherein said computer-generated image data of step (ii) and/or said modified computer-generated image data of step (iii) are determined (defined) according to said wearer identifier, optionally in accordance with access rights.

Systems and Devices of the Invention

Another aspect of the present invention provides a lighting terminal, comprising:

a light source suitable (arranged, configured) for displaying a holographic image by illumination, optionally, a sensor suitable (arranged, configured) for detecting the presence of a wearer provided with a head-mounted computer-generated holographic image displaying device, and optionally, a communication interface suitable (arranged, configured) for transmitting, from and/or to said terminal, data selected from visualization parameter data, computer-generated holographic image data and modified computer-generated holographic image data.

This lighting terminal is suitable (arranged, configured) for the implementation of the method of invention where the image is a holographic image.

In one embodiment, said light source is further suitable (arranged, configured) for transmitting computer-generated holographic image data and/or modified computer-generated holographic image data from said lighting terminal.

Another aspect of the present invention provides a system comprising a plurality of lighting terminals as described therein, wherein each of said lighting terminals is connected to a lighting server via a lighting network.

This system is suitable (arranged, configured) for the implementation of the method of invention where the image is a holographic image.

Another aspect of the present invention provides a head-mounted computer-generated image displaying, comprising:

a phase and/or amplitude spatial light modulator, for example made of LCoS (liquid crystal on silicon) or Glass transmissive Active Matrix Liquid Crystal optionally, a light source suitable (arranged, configured) for displaying an image upon illumination, and optionally, a communication interface suitable (arranged, configured) for transmitting, from and/or to said device data selected from visualization parameter data, computer-generated image data and modified computer-generated image data, This device is suitable (arranged, configured) for the implementation of the method of invention.

Another aspect of the invention pertains to the use of a phase and/or amplitude spatial light modulator (SLM), preferably a LCoS SLM or a Glass transmissive Active Matrix LC SLM, for the manufacture of a wearer-prescription-compliant head-mounted display device.

Another aspect of the invention relates to the medical use of a phase and/or amplitude spatial light modulator (SLM), namely to a SLM, preferably a LCoS SLM or a Glass transmissive Active Matrix LC SLM, for use in correcting ametropia in a wearer-prescription-compliant head-mounted display device.

BRIEF DESCRIPTION OF THE DRAWINGS

FIGS. 9-11 show the structure of exemplary databases useful in the method of the invention.

DEFINITIONS

Figure 1:
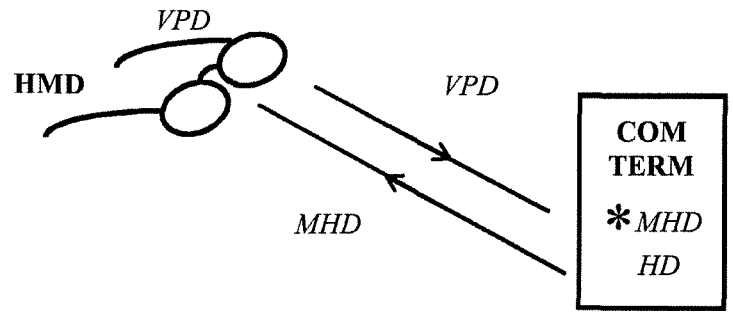
FIGS. 1-8 shows embodiments of the methods of the invention.

The following definitions are provided to describe the present invention.

"Computer-generated images" are known in the art. According to the present invention, computer-generated images comprise computer-generated holographic images, but also other types of computer-generated images such as 2D-diffraction images, etc. Preferred computer-generated images in the present invention are computer-generated holographic images.

"Computer-generated holographic images" are known in the art. Such holographic images can be displayed by reading (illuminating) computer-generated holograms. Computer-generated holograms are also referred to as synthetic or digital holograms. Computer-generated holograms are generally obtained by selecting a 2D or 3D image, and digitally computing a hologram thereof. The holographic image can be displayed by optical reconstruction, namely by illuminating (reading) the hologram with a suitable light beam (reference beam of the hologram). The image may be 'real' in that it may be displayed on a physical screen or support, or 'aerial' (virtual). The hologram may be printed onto a holographic support or implemented on an SLM as explained thereafter.

"Image data" ID are known in the art. They generally comprise coded data (set(s) of coded data) that allow for the display of an image for visualization by a subject. The image can be a computer-generated image such as a computer-generated holographic image. Image data include data that code for the image itself (its "content"), but may also further include data coding for the position (location) of the display of the image in the vision field of the wearer (for example with reference to the frame of the device HMD) and/or for the size of the image to be visualized (zoom or enlargement) and/or for the location of the focus plan of the image to be visualized. Image data may provide for several images to be displayed, for example for multiplex display. Image data may provide for an image in one color (for example, black and white), or in more than one color, for example using at least three colors, for example the three primary colors. According to the invention, said computer-generated image data ID may be modified (modified computer-generated image data MID) or not (ID). The data ID or MID can be decoded for allowing display. According to the invention, said data can be stored in a memory of the HMD and/or in a memory on a terminal such as a communication terminal COM TERM and/or in a database accessible via a server such as a communication server COM SERV. Computer-generated image data ID or MID can be stored in an image database IM DB. Said database IM DB comprises a memory suitable (arranged, configured) for storing and retrieving sets of image data and can be part of a server such as communication server COM SERV, or connected to the server via a communication network COM NETW.

"Computer-generated holographic image data" HD are known in the art. They generally comprise coded data (set(s) of coded data) that allow for the display of a computer-generated holographic image for visualization by a subject. Computer-generated holographic image data include data that code for the computer-generated holographic image itself (its "content", which can be a picture, an alphanumerical character and combinations thereof, etc.), including for each pixel of the image (2D, 3D), information about the phase and amplitude. Computer-generated holographic image data may also further include data coding for the position (location) of the display of the holographic image in the vision field of the wearer (for example with reference to the frame of the device HMD) and/or for the size of the holographic image to be visualized (zoom or enlargement) and/or for the location of the focus plan of the holographic image to be visualized. Such data for holographic image location, size and focus plan are especially useful for display of the holographic image on a device HMD provided with a built-in light source. When the device HMD is not provided with a built-in light source, namely when the light source is remote from the device HMD, one may consider that the data for location and focus plan are implicitly included in the computer-generated holographic image data. Said data may however further comprise data for the size of the image (e.g. for zooming). Computer-generated holographic image data may also provide for several images to be displayed, for example for multiplex display. Computer-generated holographic image data may provide for an image in one color (for example, black and white), or in more than one color, for example using at least three colors, for example the three primary colors. The data that code for the computer-generated holographic image itself (its "content") are advantageously phase-coded. According to the invention, said computer-generated holographic image data HD may be modified (modified computer-generated holographic image data MHD) or not (HD). The data HD or MHD can be decoded and transmitted to displaying means, for example to an SLM, for allowing reading of the hologram and display of the corresponding holographic image upon suitable (arranged, configured) illumination. According to the invention, said data HD or MHD can be stored in a memory of the HMD and/or in a memory on a terminal such as a communication terminal COM TERM and/or in a database accessible via a server such as a communication server COM SERV. Sets of holographic image data HD or MHD can be stored in a holographic image database of computer-generated holographic image data HOLO DB and/or of modified computer-generated holographic image data M HOLO DB. Said database DB comprises a memory suitable (arranged, configured) for storing and retrieving sets of holographic image data and can be part of a server such as communication server COM SERV, or connected to the server via a communication network COM NETW.

Examples of structures of computer-generated holographic image databases are shown on FIGS. 10-11. FIG. 10 illustrates an example of a database HOLO DB comprising computer-generated holographic image data HD. The holographic images can be alpha-numerical characters (letters "A", "B", etc.; numbers "1", "2", etc.) or more complex images such as pictures. The data may include location LOC of the image in the vision field of the wearer. Further, sets of data may be determined (defined) in accordance with access rights AC. FIG. 11 illustrates an example of a database M HOLO DB of modified computer-generated holographic image data MHD. The same holographic images as for FIG. 10 are shown, but modified for an ametropic wearer so as to take into account prescription data of said wearer. On FIGS. 10-11, each set of unmodified or modified computer-generated holographic image data HD and MHD can for example be retrieved form the database using an identifier (HOLO i, M HOLO i). FIGS. 10-11 can be generalized to image databases IM DB, M IM DB.

"Servers" SERV are known in the art. A server SERV may be connected via an extended network NETW to a plurality of terminals TERM. The network NETW allows for data transmission and may rely on wireless communication such as radio frequency communication (Wi-Fi, Bluetooth, 3G, 4G, etc.) and/or optical communication such as Li-Fi or FSO (infra-red IR, near infra-red NIR, short-wavelength infra-red SWIR, visible, etc.) and/or wire-communication (Ethernet, optical fiber). The server SERV may comprise one or more databases DB and/or it may be connected to one or more databases DB. The server SERV can be a communication server COM SERV and/or a lighting server LIGHT SERV.

"Providing data" can be performed by means known in the art. Data may be provided by wireless communication (RF, including Wi-Fi, Bluetooth, 3G, 4G; optical including Li-Fi or FSO, IR, near IR, visible; etc.) or by wire-communication (for example trough an Ethernet cable, a USB port, optical fiber, etc.) from one entity to another. Optical communication may be preferred with respect to possible safety concerns. Indeed, use of optical communication such as by Li-Fi or FSO enables to limit exposure to certain types of waves (Wi-Fi, etc.) which may raise health issues. This is applies in particular to communication of data to/from a head-mounted device, since such device is for wearing in the vicinity of the brain.

Data may be provided by access to and retrieval from a memory or database containing stored data (access and retrieval may be direct or indirect; conditional or not; etc.). Data may also be provided by way of acquisition, for example by taking a digital picture. The acquisition of data may be 'live' or real-time, i.e. continuous, such as by recording a digital video. Data may also be provided analogically, for example by 'manual' set-up (acquisition by haptic means, etc.).

Providing data may also be dependent on pre-defined access rights, and/or the detected presence in the vicinity of a given terminal (sensor/s).

Figure 12:
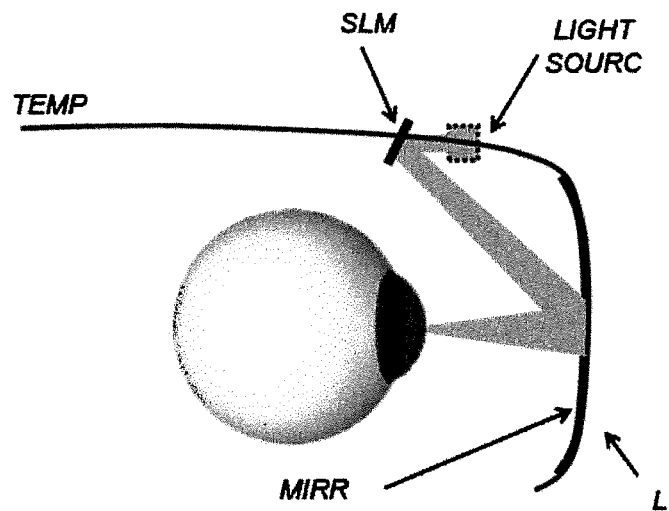
FIGS. 12-14 show exemplary structures for head-mounted devices of the invention.
Figure 13:
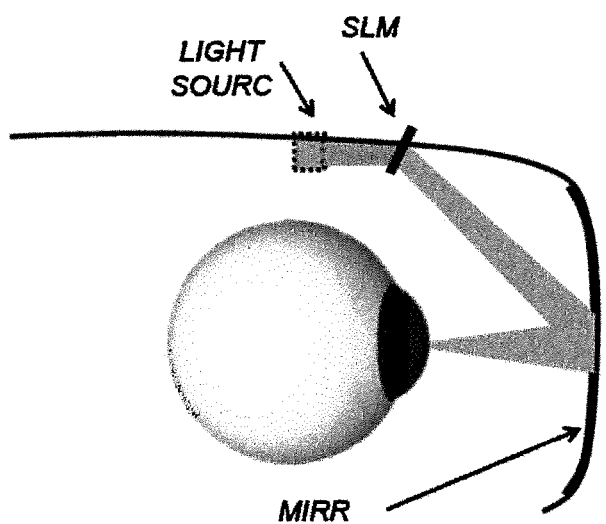
Figure 14:
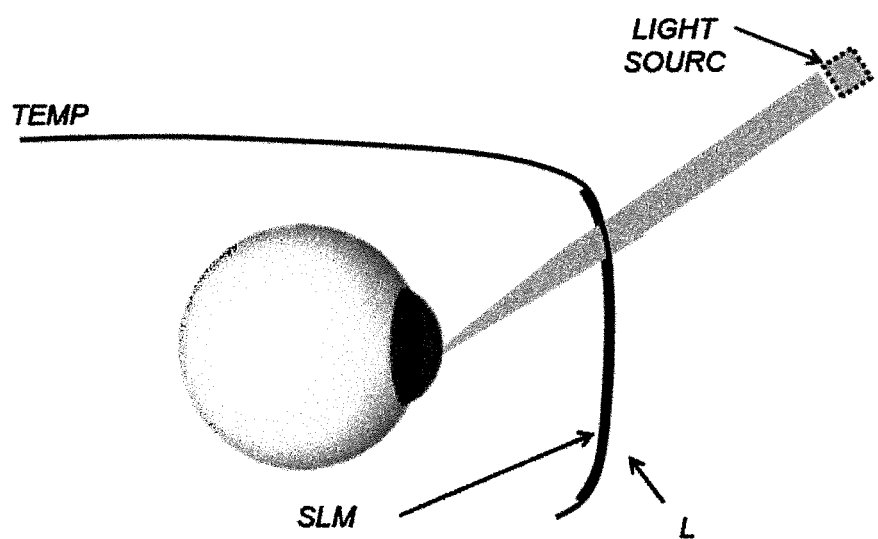

"Head-mounted display devices" (HMD) are known in the art. Such devices are to be worn on or about the head of a wearer, including helmet-mounted displays, optical head-mounted displays, head-worn displays and the like. They include optical means for displaying an image for visualization by the wearer. The HMD may provide for the display of a computer-generated image only, or for the superimposed visualization of a computer generated image and of a 'real-life' vision field. The HMD may be monocular (single eye) or binocular (both eyes). The HMD of the invention can take various forms, including eyeglasses, masks such as skiing or diving masks, goggles, etc. The HMD may comprise one or more lenses. Said lenses can be selected from prescription lenses. According to the invention, the HMD comprises a spatial light modulator (SLM). In preferred embodiments, the HMD is a pair of eyeglasses provided with lenses. Examples of devices HMD of the invention are illustrated at FIGS. 12-14.

"Spatial light modulators" (SLM) are known in the art. Said SLM can be a phase SLM, a phase-only SLM, an amplitude-only SLM, or a phase and amplitude SLM. Where present, the amplitude modulation is preferably independent from the phase modulation, and allows for a reduction in the image speckle, so as to improve image quality in terms of levels of grays. In preferred embodiments, the SLM is a phase or a phase-only SLM. According to the invention, said SLM may be:

a reflective SLM (the light beam that causes the display is reflected on the SLM). Examples thereof include SLMs made of LCoS material (Liquid Crystal on Silicon). Possible commercial sources include Holoeye, Boulder Nonlinear Systems, Syndiant, Cambridge technologies. A device HMD of the invention comprising a reflective SLM, further comprises a holographic mirror; or a transmissive SLM (the light beam that causes the display is transmitted through the SLM). Preferably, the transmissive SLM is a "see-through" or "transparent" SLM, namely an SLM with a transmissive rate of >85% or >90%. Such "see-through" SLM can advantageously be directly placed before a wearer eye, without otherwise impairing vision. Examples thereof include transparent active matrices made of thinned silicon on a glass (SOI: silicon on Insulator) or sapphire substrate or Glass transmissive Active Matrix Liquid Crystal. Such products are developed by Citizen Finetech Miyota. Other examples include LCD-type transparent active matrices such as amorphous silicon, IGZO, etc. Examples of possible commercial sources include Boulder Nonlinear Systems. A device HMD of the invention comprising a transmissive SLM may or may not comprise a holographic mirror.

The SLM preferably has one or more, preferably all, of the following features:

a pixel size of <10 µm, preferably <5 µm or <4 µm. It is preferred to select SLMs with small pixel sizes, so as to have spaced-apart diffraction orders, which are easy to select/pick, and so as to offer a suitable (arranged, configured) spatial sampling of the phase, yielding an image with higher resolution and better reproduction of the details thereof. Further, a smaller pixel size provides the possibility of images of wider fields, since the diffraction angles are larger.

a diffraction efficacy of >85%, preferably >90%. This is desirable because it provides for improved dynamics (response) and a suitable (arranged, configured) sampling of the phase of a single pixel;

an invisible command matrix and hardware (to pilot pixels);

phase dynamics of >2π;

phase sampling of 16 levels or more (4 bits);

fill factor (pixel useful area) of >90%, preferably >95%.

According to the invention, phase SLMs are advantageous in that they allow for the display of images whose image data are phase-coded. Phase-coding lowers the energy required for a given display of image (no intensity loss as compared to amplitude-only-modulation coding). Correspondingly, the energy consumption of the HMD can be advantageously reduced due to lesser computation resource requirements. However, it is also advantageous that the SLM also allows for amplitude modulation, since it provides for improved image quality, even though in that case computation may require more resources and hence consume more energy. This enables the use of smaller batteries, and thus reduces the bulk of the HMD and extends the energy autonomy of the device. According to the invention, the SLM acts as a 'programmable' hologram, namely an electronically addressable reading support that allows the display of the desired holographic image.

"Visualization parameter data" (VPD) include one or more of head-mounted device HMD data (such as frame data FD and lens data LD) and of wearer ophthalmic data OD (OD include data such as prescription data PD, eye sensitivity data SD, and biometry data BD). Said VPD may be stored on a memory built in on the HMD, and/or be stored on a dedicated database accessible via a server. The visualization parameter data VPD can be considered as wearer-customized, since they include OD (specific to the wearer) and HMDD data (specific to the device selected by the wearer).

"Head-mounted device data" HMDD refers to a set of one or more data corresponding to physical features of the HMD device, in particular pertaining to the design, geometry or structure of the HMD. Such HMDD include data such as frame data FD and/or lens data LD. Said HMDD may be stored on a memory built in on the HMD, and/or be stored on a dedicated database accessible via a server. According to the invention, such data are very useful for optimizing display with the HMD, and in particular for correcting optical aberrations that result from the geometry of the HMD. A wearer can select a given HMD device, wherein said HMD device has corresponding HMDD data. Such HMDD data can be considered as wearer-customized visualization parameter data since the HMDD data are those of the device selected by the wearer.

"Frame data" refers to a set of one or more data relating to the structure of the HMD, and may comprise design parameters such as the relative location of one element of the HMD within the HMD. This includes the location of the SLM, the relative location of a light source if any, the distance between the SLM and a lens of the HMD, etc. This also includes data pertaining to the features of the SLM, of the light source.

"Lens data" (LD) refers to a set of one or more data characterizing an ophthalmic lens. Said data comprise data defining one or more geometrical (surface) characteristics and/or one or more optical characteristics of the lens, such as the optical index of the lens material. Lens data LD may correspond to the back surface of a lens and/or to the front surface of a lens, or their relative positions. Said lens data LD may further include data pertaining to the general geometry of the lens, for example average radius of curvature, convexity data, etc. Said lens data LD may also comprise data on surface coatings of the lens being present on the lens and characteristics thereof; data pertaining to a holographic mirror being present on the lens and characteristics thereof; or data pertaining to electro-chromic materials being present in the lens and characteristics thereof.

"Wearer ophthalmic data" or "ophthalmic data" OD are known in the art. Wearer ophthalmic data include wearer prescription data PD, wearer eye sensitivity data SD and wearer ophthalmic biometry data BD, and generally data pertaining to any wearer vision defect, including for example data pertaining to chromatic aberrations, lack of eye lens (aphakia), etc.

"Prescription data" PD are known in the art. Prescription data refers to one or more data obtained for the wearer and indicating for each eye a prescribed far vision mean refractive power $P_{FV}$, and/or a prescribed astigmatism value $CYL_{FV}$ and/or a prescribed astigmatism axis $AXE_{FV}$ and/or a prescribed addition A suitable for correcting the ametropia and/or presbyopia of each eye. The mean refractive power $P_{FV}$ is obtained by summing the half value of the prescribed astigmatism value $CYL_{FV}$ to the prescribed sphere value $SPH_{FV}$: $P_{FV}=SPH_{FV}+CYL_{FV}/2$. Then, the mean refractive power for each eye for proximate (near) vision is obtained by summing the prescribed addition A to the far vision mean refractive power $P_{FV}$ prescribed for the same eye: $P_{NV}=P_{FV}+A$. In the case of a prescription for progressive lenses, prescription data comprise wearer data indicating for each eye values for $SPH_{FV}$, $CYL_{FV}$ and A. In preferred embodiments, wearer prescription data PD are selected from astigmatism module, astigmatism axis, power, prism and addition, and more generally any data indicating the correction of any given vision defect. Such defect may result from a partial retinal detachment, retina or iris or cornea malformation, "Wearer eye sensitivity data" SD are known in the art. Wearer eye sensitivity data include data for spectral sensitivity (to one or more wavelengths or spectral bands); general sensitivity such as brightness sensitivity, for example for outdoors brightness sensitivity. Such data are of importance to optimize contrast for visualization of an image by the wearer.

"Wearer ophthalmic biometry data" or "biometry data" BD are known in the art. Biometry data include data pertaining to the morphology of the wearer, and typically include one or more of monocular pupillary distance, inter-pupillary distance, axial length of the eye, position of the center of rotation of the eye, punctum remotum, punctum proximum, etc.

Figure 9:

"Wearer database" WEAR DB is a database comprising a memory suitable (arranged, configured) for storing and retrieving wearer visualization parameter data VPD. Databases and memories are known in the art. The retrieval of visualization parameter data can be achieved through the use of dedicated pointers, such as visualization parameter identifiers VP ID. The structure of one example of a wearer database WEAR DB is illustrated at FIG. 9. On FIG. 9, identifiers WEAR ID can serve as visualization parameter identifiers VP ID. Each wearer identifier WEAR ID 1, 2, . . . n, allows the retrieval of various prescription data PD, here illustrated as power P, astigmatism ASTI, addition ADD, etc., for each of the right eye RE and the left eye LE of the wearer.

"Light sources" LIGHT SOURC are known in the art. According to the invention, a light source LIGHT SOURC is any light source that can emit a light beam suitable (arranged, configured) for displaying the image for visualization by the wearer. Regarding display of holographic images, the light beam comprises the reference beam for the hologram. The image can be displayed from the modified computer-generated image data (for example, modified computer-generated holographic image data) upon illumination of said HMD device by said light source LIGHT SOURC. The light source LIGHT SOURC is at least partially coherent, preferably quasi or fully coherent (spatially and spectrally). Coherence of the light generally results from the stimulated emission in an active medium within a resonance cavity. Coherence may be only partial due to the spontaneous emission of some media that are used for stimulated emission. Examples of coherent sources include lasers and narrow-spectrum laser diodes. Examples of partially coherent sources include certain laser diodes, modulated laser diodes, S-LEDs, some LEDs. Further examples are described in EP 0 421 460 B1. Preferably according to the invention, the light source LIGHT SOURC can be almost fully coherent (quasi-coherent), so as to suppress speckle effects resulting from perfect coherence.

According to the invention, the light source LIGHT SOURC may be mono-chromatic or polychromatic, for example tri-chromatic. For monochromatic use, it is preferred that the light beam emitted for image display comprises green light (wavelengths of about 500-560 nm). Green light is advantageous in that a lower energy (for example <1 mW) is required since the human retina is more sensitive to wavelengths in this range. Examples of monochromatic light sources with emission at about 520-550 nm include class 2 lasers, lasers at 532 nm, laser diodes at 520 nm (for example from Osram or Nichia), LED emitting at around 550 nm, etc. Preferably, the power of the monochromatic source is <10 mW. Other suitable monochromatic light sources include red: 615-645 nm; green: 520-550 nm; blue: 435-465 nm. For polychromatic use, it is preferred to use wavelengths (red, green, blue) close the standards used in imaging (red: 615-645 nm; green: 520-550 nm; blue: 435-465 nm). When three distinct sources are used (red, green, blue), each of said sources preferably has a power of <1 mW. Examples of polychromatic light sources include lasers, laser diodes, LEDs or S-LEDs. Preferably, at least three, preferably four or five different emission wavelengths may be used in combination so as to improve chromatic quality.

In preferred embodiments, in order to avoid noise resulting from certain external light sources (natural light, other LEDs in the wearer environment . . . ), the light source LIGHT SOURC of the invention may be synchronized with a specific frequency tied to the device, similarly to synchronous detection. Said frequency is preferably much higher than the Flicker frequency so as to avoid making image modulation visible. Such synchronizing is then required between the light source LIGHT SOURC and the image displayed by the device HMD. In some embodiments, there are thus two synchronizing stages: identification of the illumination light source LIGHT SOURC to avoid unwanted interaction with parasite light sources, and modulation for displaying the right image at the right color.

The illumination need not be directional, as long as a suitable (arranged, configured) light beam can illuminate the device HMD (and its SLM) to cause the desired display. According to the invention, said light source LIGHT SOURC may be provided on a lighting terminal LIGHT TERM and/or may be built-in on said HMD device. In one embodiment, the light source LIGHT SOURC is provided on a remote lighting terminal LIGHT TERM, namely a terminal distinct over the HMD. Said lighting terminal LIGHT TERM may or not be connected to a server SERV via a network NETW. When provided on a lighting terminal LIGHT TERM, the light source LIGHT SOURC may be divergent. The emission of a light beam by the light source LIGHT SOURC does not disturb the visual environment of the people in the vicinity of the lighting terminal LIGHT TERM, irrespective of whether said people are provided with a device HMD. Further, the use of a divergent, low power (about <100 mW) light source LIGHT SOURC is advantageous is terms of eye safety, since an HMD wearer and an HMD non-wearer are not endangered by the use of a laser. According to the invention, it is preferred that said light source LIGHT SOURC is also suitable (arranged, configured) for transmitting data. A preferred embodiment includes a light source LIGHT SOURC that is suitable (arranged, configured) for both causing the display of the image by illumination and for transmitting data. When transmitting data, the light source LIGHT SOURC can emit said data by way of optical communication (visible), for example by Li-Fi or FSO communication. Said data can be computer-generated image data (modified or not, ID or MID), computer-generated holographic image data (modified or not MHD or HD) or VPD such as PD. The data can be sequentially emitted, for example with a modulation higher than the Flicker frequency, notably at a frequency of 75 Hz or more or 80 Hz or more. Such frequencies are not perceived by the human eye and the light beam for image display does not interfere with vision in 'real-life'.

"Terminals" TERM are known in the art. According to the invention, terminals TERM include lighting terminals LIGHT TERM and communication terminals COM TERM. A terminal TERM may simultaneously be a communication- and a lighting-terminal. This would be the case where, advantageously according to the invention, the light source LIGHT SOURC is also suitable (arranged, configured) for transmitting data to the HMD. Terminals include terminal with fixed geographic coordinates or fixed GPS coordinates and terminals with non-fixed geographic coordinates or non-fixed GPS coordinates. Terminals with fixed geographic or GPS coordinates include terminals located in train stations, metro stations, museums, airports, at traffic lights, etc. Terminals with non-fixed GPS include smartphones, tablets, boxes embarked on a vehicle, TV set top boxes, internet set top boxes, computers, etc. In some embodiments, the terminal is other than a smartphone and/or other than a tablet. The terminal may be portable or not. The terminal may be either stand-alone or connected to a network.

DETAILED DESCRIPTION OF THE DRAWINGS

The present invention provides methods and systems (terminals, devices) for the customized display of images by a head mounted device.

Methods of the Invention

In one aspect, the invention relates to a computer-implemented method for the processing of computer-generated image data for display with a head-mounted computer-generated image displaying device HMD worn by a wearer. The method comprises:
  (i) a step of providing visualization parameter data VPD selected from
    wearer ophthalmic data OD including wearer prescription data PD, wearer eye sensitivity data SD and wearer ophthalmic biometry data BD; and
    head-mounted device data HMDD including frame data FD and lens data LD,
  (ii) a step of providing computer-generated image data ID,
  (iii) a step of calculating modified computer-generated image data MID from the computer-generated image data ID of step (ii) by taking into account the visualization parameter data VPD of step (i), and
  (iv) a step of providing the modified computer-generated image data MID of step (iii) to said device HMD for display.

The step (i) of providing visualization parameter data VPD can be a step of transmitting said VPD data. For example, the transmission may be to a controller on the HMD. The transmission may be by wireless communication or by input through a flash-drive (USB key). Step (i) may also be performed by manually providing a setup on the HMD, for example by turning a thumb wheel on the HMD for adjusting visualization parameters VP to obtain the desired focus or to change the location of the image within the vision field of the wearer. In such case, the VPD data are provided on an analogical basis.

The step (iii) of calculating advantageously takes into account visualization parameter data VPD. This provides for a customization of the image display, taking into wearer ophthalmic data OD and/or device data HMDD. In particular, the customization allows to limit or at least to partially correct the aberrations created by the optical system: optical aberrations created by the HMD, and notably by the fact that the SLM located on the HMD may not be in the visual axis of the device for the wearer (off-centered position of the SLM). Correspondingly, the display of an uncorrected (unmodified) image would lead to image distortions that heavily impact on visual comfort and image restitution.

The step (iii) also takes into account the wearer prescription data PD to provide an image display that is customized to the wearer's ametropia/presbyopia. For example, for a given myopic wearer with given prescription data PD, the image displayed according to the invention would be perfectly sharp for said wearer, but would not be sharp for another wearer having different prescription data.

The step (iii) comprises a calculation wherein the computer-generated image data are modified accordingly. For an HMD with an SLM, in terms of wave front, this means that the light wave front emitted by the SLM (by transmission or reflection) is modified to take into account the VPD data. It is possible to code the image as it would be seen through the prescription lenses of the ametropic wearer. Such calculations are in practice easier to perform in the Fourier space: calculation of the Fourier image hologram and of the wave front hologram. The wave front hologram may be described as an analytical surface, with calculation techniques known in the art, for example with Zernike polynomials.

The step (iii) may comprise a single (one shot) calculation, or may comprise 'dynamic', continuous or real-time calculations, for example for dynamic visualization of an image. Further, step (iii) may be performed on an on/off basis. For example, for a myopic wearer, step (iii) may be performed for far-vision image display, whereas step (iii) may not be required for near-vision image display.

In preferred embodiments, the visualization parameter data VPD comprise wearer prescription data PD. Said prescription data PD are preferably selected from astigmatism module, astigmatism axis, power, prism and addition.

In preferred embodiments, said computer-generated image is a holographic image. The HMD device is thus a head-mounted computer-generated holographic image displaying device HMD. Correspondingly, in the method of the invention, said computer-generated image data ID are computer-generated holographic image data HD, said modified computer-generated image data MID are modified computer-generated holographic image data MHD.

In another aspect, the invention provides a computer-implemented method for the display of computer-generated holographic images with a head-mounted computer-generated holographic image displaying device HMD worn by a wearer. Said method comprises steps (i), (ii), (iii) and (iv) as described herein and may further comprise (v) a step of emitting, by at least one light source LIGHT SOURC, a light beam suitable (arranged, configured) for displaying the holographic image from the modified computer-generated holographic image data MHD of step (iii) by illumination of said device HMD. For an HMD with an SLM, step (v) thus comprises a step of illuminating the SLM with the light source LIGHT SOURC.

In some embodiments, said light source LIGHT SOURC is provided on a remote lighting terminal LIGHT TERM. In other embodiments, said light source LIGHT SOURC is built-in on said device HMD. In some embodiments, a light source LIGHT SOURC is provided on a remote lighting terminal LIGHT TERM and a light source LIGHT SOURC is built-in on said device HMD.

Advantageously according to the invention, when the light source LIGHT SOURC is provided an external terminal TERM (remote terminal, distinct over the HMD), the light source is 'fixed' in that it has, at least momentarily, constant geographic or GPS coordinates. Thus, it is possible to 'set' the image, and the image remains 'attached' to the light source LIGHT SOURC, for example a terminal TERM located near a given painting in a museum. This is advantageous in that there is no requirement for an eye tracker and for further calculations to 'attach' the image to the painting, even if the wearer turns the head.

According to the invention, the light source LIGHT SOURC may emit light in a multiplex mode. The multiplex mode may be spatial or temporal. The multiplexing may also involve emitting light for display by a plurality of devices HMD. In a museum example, a single light source LIGHT SOURC can emit for the benefit of several visitors simultaneously.

According to the invention, where said light source LIGHT SOURC is provided on a remote lighting terminal LIGHT TERM, said light source LIGHT SOURC can advantageously also be suitable (arranged, configured) for transmitting image data from said light terminal LIGHT TERM to said device HMD. The light source LIGHT SOURC thus plays a dual role of providing computer-generated holographic image (modified or not) data for display, and of illuminating the device HMD for causing the holographic image display. This dual role is particularly advantageous, in that it provides for image display on HMD devices, even if said HMD devices do not comprise their own light source. Further, it relies on a dual role of a communication terminal COM TERM that can transmit data including image data and, advantageously immediately thereafter, can cause display of the image by providing an illumination with a light beam suitable (arranged, configured).

The step of providing said holographic image data (modified or not) thus comprises a step of transmitting said data by means of optical communication between the light source LIGHT SOURC on the remote light terminal LIGHT TERM, for example by Li-Fi or FSO communication. In such embodiments, step (ii) may comprise a step of transmitting said computer-generated holographic image data HD from said light source LIGHT SOURC to the device HMD or step (iv) may comprise a step of transmitting said modified computer-generated holographic image data MHD from said light source LIGHT SOURC to said device HMD.

Figure 2:
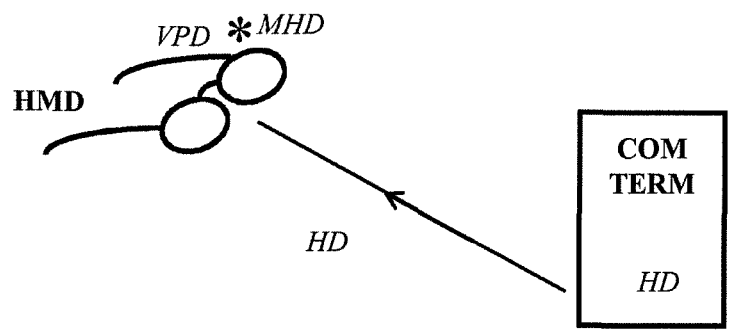

In one aspect of the invention, the visualization parameter data VPD of step (i) may be stored in a memory on the device HMD. In such case, the step (iii) of calculating modified data may be performed either by a processor located on the device HMD ('local' calculation), or by a remote processor ('remote' calculation). Said remote processor may be located on a remote terminal TERM, for example a remote lighting terminal LIGHT TERM or a remote communication terminal COM TERM. Said terminal TERM may or may not be connected to a server SERV via a network NETW (stand-alone terminal or network-connected terminal). Said remote processor may also be located in a server SERV. Thus, according to the invention, step (i) may comprise: (i-a) a step of detecting, by at least one communication terminal COM TERM, the presence of said wearer; and (i-b) responsive to the detected presence at step (i-a), a step of transmitting said visualization parameter data VPD from said device HMD to said communication terminal COM TERM, and step (iv) may comprise a step of transmitting modified computer-generated image data MID from said communication terminal COM TERM to said device HMD. FIGS. 1-4 illustrate embodiments of the invention, wherein the visualization parameter data VPD are stored in a memory on the device HMD:

FIGS. 1-2 illustrate embodiments wherein computer-generated image data ID or HD are provided on a communication terminal COM TERM.

Figure 3:
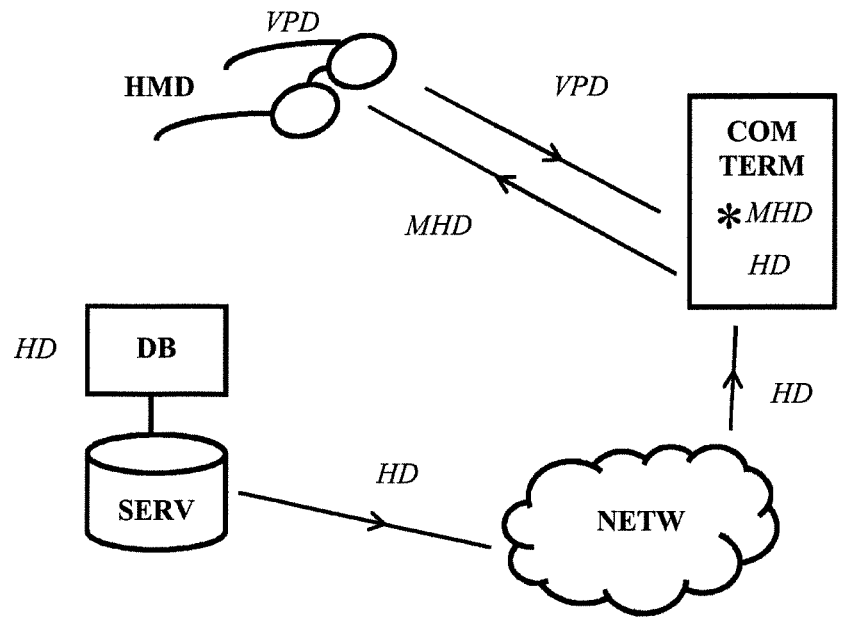
Figure 4:
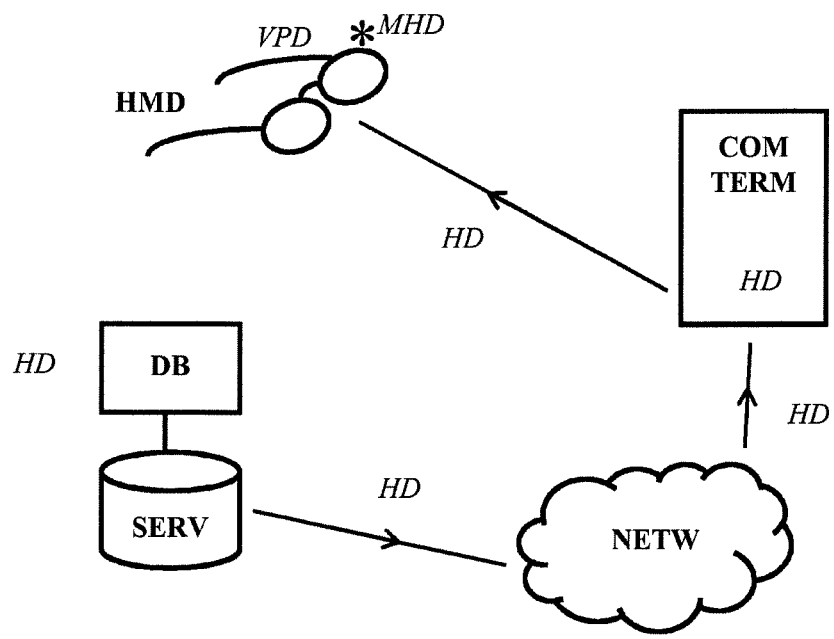

FIGS. 3-4 illustrate embodiments wherein computer-generated image data ID or HD are provided on a communication server COM SERV connected to a communication database DB.

The arrows indicate steps of providing data with annotation of the respective data transmitted, and the stars (*) indicate that the calculation step, namely step (iii), can be performed by a processor either on the terminal TERM or on the device HMD.

In another aspect of the invention, the visualization parameter data VPD of step (i) may be stored in a memory stored in a wearer database WEAR DB on a communication server COM SERV connected to said communication terminal COM TERM via a communication network COM NETW, in association with a visualization parameter identifier VP ID. This identifier VP ID can be defined as an identifier that allows the retrieval of said visualization parameter data (VPD). For example, it allows the retrieval of OD or HMDD data. This embodiment is advantageous in that it allows updates of the visualization parameter data VPD. For example, for a given wearer, prescription data may evolve over time and/or the wearer may change device HMD. The use of a server in the method of the invention provides for update features to faithfully customize image displays by the device HMD. The visualization parameter identifier VP ID can be an individual one, for example, a unique identifier that identifies a given wearer. The visualization parameter identifier VP ID may also be a generic identifier (group identifier), for example to identify a group of wearer having identical prescription data PD, for example wearers having the same myopia correction, or a group of wearer having the same model of device HMD. The visualization parameter identifier VP ID may be a code, such as a QR code or an RFID code, located on the HMD. It may also be a modulation frequency specific to the HMD (and the wearer). It may be an optical signature.

Where the visualization parameter data VPD are stored in a database DB on a server SERV, the retrieval of the visualization parameter data VPD can be performed by transmitting the visualization parameter data VPD from the database DB to a terminal TERM, and then optionally from said terminal TERM to the device HMD. Accordingly, step (i) may comprise (i-a) a step of detecting, by said communication terminal COM TERM, the presence of said wearer, and (i-b) responsive to the detected presence at step (i-a), a step of transmitting said visualization parameter data VPD from said communication server COM SERV to said communication terminal COM TERM. Step (i) may then optionally comprise (i-c) a further step of transmitting visualization parameter data VPD from said communication terminal COM TERM to said device HMD. The update of visualization parameter data VPD may be performed via a computer at an eye specialist shop, or by the wearer through a computer, a tablet or a smartphone.

Where the visualization parameter data VPD are stored in a database DB on a server SERV, step (iii) of calculating modified image data MID may be performed either by a processor located on a terminal TERM or by a processor located in a server SERV. Accordingly, wherein step (iii) may comprise a step of transmitting modified computer-generated image data MID from said communication terminal COM TERM to said device HMD, and optionally, a prior step of transmitting modified computer-generated image data MID from said communication server COM SERV to said communication terminal COM TERM.

Figure 5:
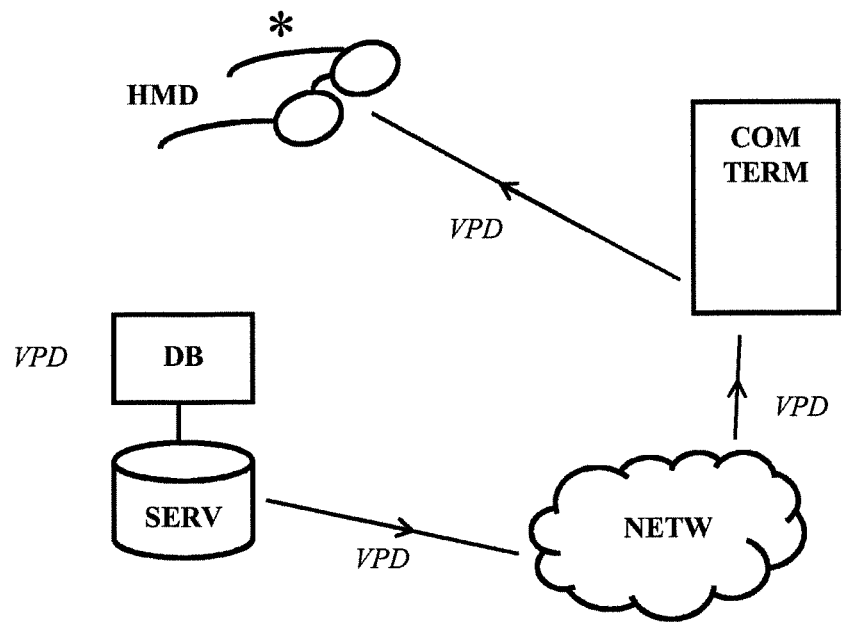

FIGS. 5-8 illustrate embodiments of the invention, wherein the visualization parameter data VPD are stored in a database:

FIG. 5 illustrates an embodiment wherein visualization parameter data VPD are retrieved from a communication database DB and transmitted to the device HMD via a communication terminal COM TERM.

Figure 6:
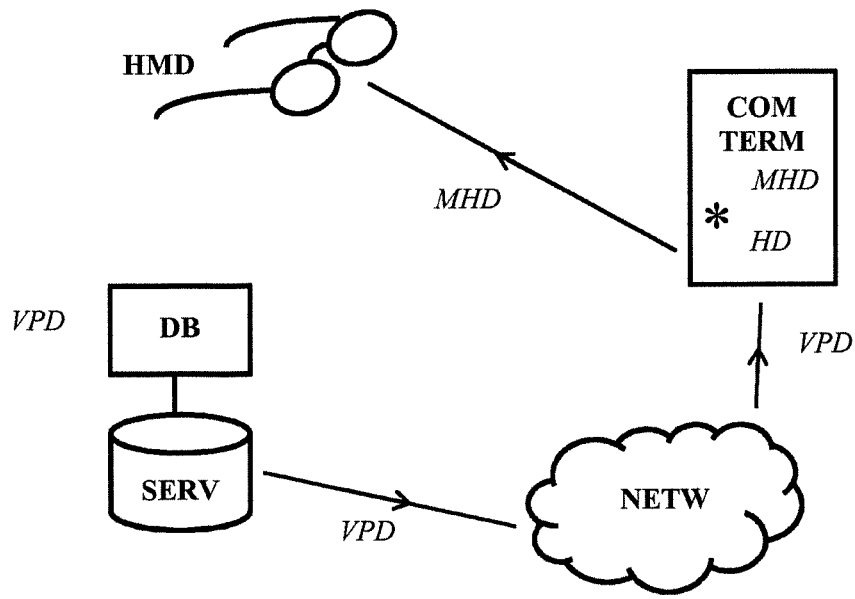

FIG. 6 illustrates an embodiment wherein computer-generated image data ID, HD are provided on a communication terminal COM TERM.

Figure 7:
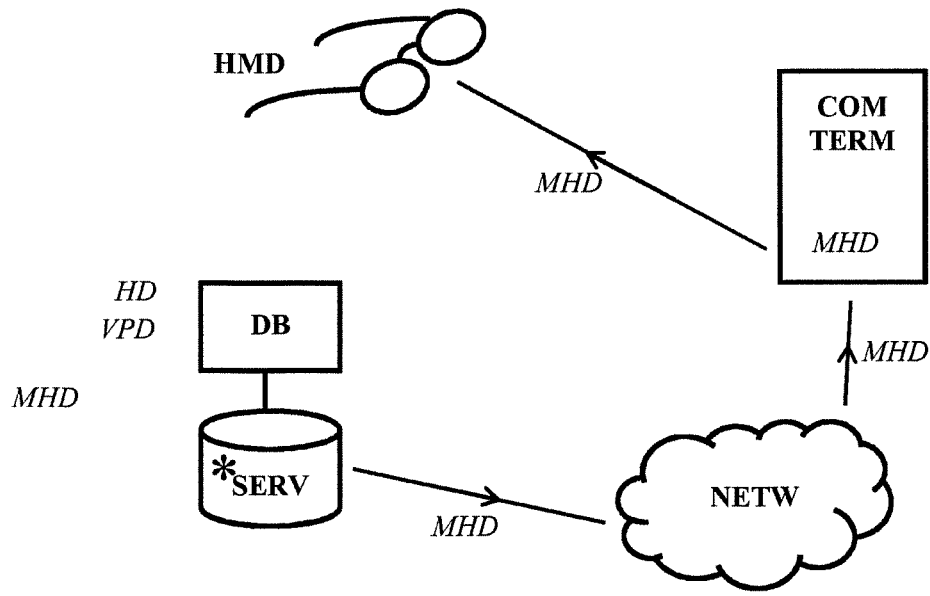
Figure 8:
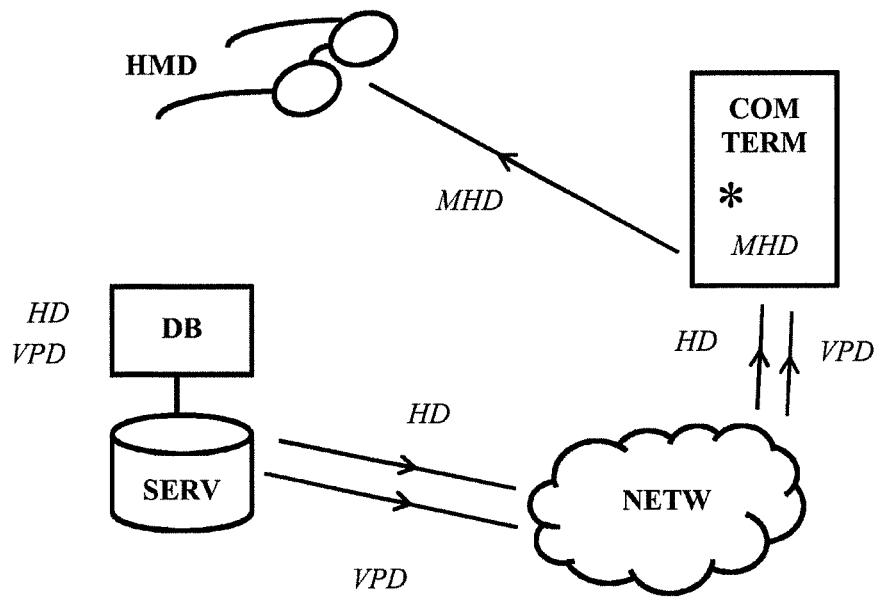

FIGS. 7 and 8 illustrate embodiments wherein computer-generated image data ID, HD are provided on a communication server SERV connected to a communication database DB.

The arrows indicate steps of providing data, and the stars (*) indicate that the calculation step, namely step (iii), can be performed by a processor on the terminal TERM, on the server SERV or on the device HMD.

According to the invention, where image data are stored in an image database IM DB on a server SERV, it is possible to define access rights to certain images. Accordingly, where said computer-generated image data ID or said modified computer-generated image data MID are stored in an image database IM DB, the method of the invention may comprise a preliminary step of pre-registering, in said database, an association between a wearer identifier WEAR ID and said wearer, and the computer-generated image data ID of step (ii) and/or the modified computer-generated image data MID of step (iii) are determined (defined) according to said wearer identifier WEAR ID, optionally in accordance with access rights. The wearer identifier thus allows the definition of the wearer profile. The wearer identifier WEAR ID may be the same or different than the visualization parameter identifier VP ID. The wearer identifier may be a code, for example a QR code or an RFID code, located on the device HMD. It is thus possible to define one or more levels of access rights in connection with the image database IM DB.

Systems and Devices of the Invention

In another aspect, the present invention provides systems, including lighting terminals LIGHT TERM and devices HMD. Said systems are suitable (arranged, configured) for performing the method of the invention.

The invention thus relates to a lighting terminal LIGHT TERM. This terminal is suitable (arranged, configured) for the implementation of the method of the invention, in particular where the computer-generated image is a holographic image.

The light terminal LIGHT TERM of the invention comprises comprising:
- a light source LIGHT SOURC suitable (arranged, configured) for displaying a holographic image by illumination,
- optionally, a sensor SENS suitable (arranged, configured) for detecting the presence of a wearer provided with a head-mounted computer-generated holographic image displaying device HMD, and
- optionally, a communication interface INT suitable (arranged, configured) for transmitting, from and/or to said terminal, data selected from visualization parameter data VPD, computer-generated holographic image data HD and modified computer-generated holographic image data MHD.

The communication interface INT may include a USB port and/or any other interface for wireless communication, including radiofrequency such as Bluetooth, Wi-Fi, 4G, 3G; optical (Li-Fi or FSO) and/or IR communication; and/or a photodiode (for receiving data) and/or an emitter, for example a visible or near IR light source (for emitting data). Further, the light terminal LIGHT TERM may comprise one or more of the following:
- a battery or any other power means,
- a GPS for determining GPS coordinates,
- one memory or a plurality of memories,
- a digital camera,
- other sensors,
- a controller CONT suitable (arranged, configured) for processing holographic image data (modified or not). Said controller CONT is suitable (arranged, configured) for performing step (iii) and comprises a processor.

In a preferred embodiment, in the lighting terminal LIGHT TERM of the invention, said light source LIGHT SOURC is further suitable (arranged, configured) for transmitting computer-generated holographic image data HD and/or modified computer-generated holographic image data MHD from said lighting terminal LIGHT TERM.

This dual role (illumination for display and data transmission) is particularly advantageous, in that it provides for image display on HMD devices, even if said HMD devices do not comprise their own light source. Further, it relies on a dual role of a terminal that can transmit data including image data and, advantageously immediately thereafter, can cause display of the image by providing an illumination with a light beam suitable (arranged, configured).

The invention also pertains to a deployed network of lighting terminals as described herein. The invention thus relates to a system comprising a plurality of lighting terminals LIGHT TERM as described herein, wherein each of said lighting terminals LIGHT TERM is connected to a lighting server LIGHT SERV via a lighting network LIGHT NETW. Servers and networks are known in the art. For example, for communication purposes, it is possible to connect a plurality of terminals with a server via a network. Similarly, where the terminals are lighting terminals, each of said lighting terminals LIGHT TERM may be arranged (configured) to be in communication (connected) with a server LIGHT SERV via a network LIGHT NETW. According to the invention, a lighting terminal may also be a communication terminal. Further, a plurality of said lighting/communication terminals TERM may be arranged (configured) to be in communication (connected) with a server SERV via a network NETW.

In another aspect, the invention pertains to a head-mounted device. The invention provides a head-mounted computer-generated image displaying device HMD, comprising:
- a phase and/or amplitude spatial light modulator SLM, and
- optionally, a light source LIGHT SOURC suitable (arranged, configured) for displaying an image illumination, and
- optionally, a communication interface μINT suitable (arranged, configured) for transmitting, from and/or to said device HMD, data selected from visualization parameter data VPD, computer-generated image data ID and modified computer-generated image data MID, This device HMD is suitable (arranged, configured) for implementing the method of the present invention.

In a preferred embodiment, said device HMD is a pair of prescription eyeglasses with a phase SLM.

Preferably, the computer-generated image is a computer-generated holographic image. The SLM is preferably a phase SLM, for example phase-only, and can be made of LCoS; or Glass transmissive Active Matrix Liquid Crystal. The SLM may also be a "see-through" SLM provided before the wearer eye, in which case no holographic mirror is required. When the SLM is provided elsewhere than before the wearer eye, for example when the SLM is provided on the side of the device HMD or near the wearer temple, then a holographic mirror may be required.

According to the invention, the device HMD may comprise one or more of the following:
- at least one lens, wherein said lens is provided with an anti-reflection coating and optionally a holographic mirror provided on or within the lens on the side of the wearer; the holographic mirror is preferably present when the device HMD is provided with a built-in light source LIGHT SOURC,
- the lens may be part of a pair of prescription lenses,
- a battery,
- a GPS,
- at least one memory,
- a camera,
- a microphone,
- sensors, for example an eye tracker, a movement tracker or haptic means, including haptic command means,
- a micro-controller (μCONT) suitable (arranged, configured) for processing (decoding, demodulating, coding, etc.) image data. Said controller CONT may be suitable (arranged, configured) for performing step (iii) and comprise a processor.

The communication interface μINT may include a USB port and/or any other interface for wireless communication, including radiofrequency such as Bluetooth, Wi-Fi, 4G, 3G; optical (Li-Fi or FSO) and/or IR communication; and/or a photodiode (for receiving data) and/or an emitter, for example a visible or near IR light source (for emitting data).

The device HMD may comprise a memory suitable (arranged, configured) for storing data selected from visualization parameter data VPD, computer-generated image data ID and modified computer-generated image data MID. The programming of the device HMD may include inputting data selected from visualization parameter data VPD, computer-generated image data ID and modified computer-generated image data MID. Examples of devices HMD of the invention are illustrated on FIGS. 12-14. These examples are devices comprising a light source LIGHT SOURC mounted on a temple TEMP of the device, although the presence of said light source LIGHT SOURC is optional according to the invention.

The device HMD comprises a spatial light modulator SLM and a lens L.

The SLM may be located on a temple TEMP of the device HMD. The SLM may function in reflection (FIG. 12) or in transmission (FIG. 13). The light beam emitted by the light source LIGHT SOURC is respectively reflected (FIG. 12) or transmitted (FIG. 13) by the SLM, before hitting the lens L. Where the device HMD of the invention comprises a reflective SLM, the device HMD further comprises a holographic mirror. The lens L is provided with a holographic mirror MIRR on the side of the lens L facing the eye of the wearer. The lens L is also provided with an anti-reflection coating. After reflection on the holographic mirror MIRR, the light beam is directed to the wearer eye, thus causing visualization of the holographic image. The holographic mirror MIRR is off-center.

Holographic mirrors are known in the art, part of optical holography elements. They can for example comprise a diffraction grating of set fringes. The holographic mirror may be made of photopolymers of dichromated gelatins or synthetic photopolymer known in the art or bleached silver holographic emulsions. Advantageously, the holographic mirror MIRR can be combined with the lens without affecting the geometry of the lens. As a consequence, the optical function of the lens and the optical function of the holographic mirror are completely de-correlated and can be optimized independently. The holographic mirror may be designed so as to correct for some or all of the optical aberrations of the system (notably since the SLM is located on a glass temple TEMP as on FIGS. 12-13, it is off-center, which gives rise to optical aberrations in the image as visualized by the wearer). The holographic mirror may be manufactured angular fraction by angular fraction so as to limit field aberrations (reduced aperture). In such case, the mirror reflects the light in the desired wavelength(s) only for the incident light in a given direction. Such mirrors are especially advantageous for devices HMD provided with a built-in light source LIGHT SOURC. For constructing an image with larger aperture, it is possible to fragment the overall image and proceed with a scanning of the mirror by the beam.

The SLM may also be a "see-through" transmissive SLM as shown on FIG. 14. A remote light source LIGHT SOURC emits a beam that is transmitted through the lens L and the SLM to reach the wearer's eye.

For monochromatic use, the holographic mirror is optically recorded (defined) at the wavelength of illumination. For wavelength other than this wavelength, the mirror is transparent and thus does not impair vision by the wearer through the lens. For tri-chromatic use (red, green, blue), the holographic mirror is optically recorded (defined) at three wavelengths and the holographic image can be visualized in the three wavelengths considered. The holographic mirror is transparent at the other wavelengths. Similarly, for wavelengths other than the three selected wavelengths, the mirror is transparent and thus does not impair vision by the wearer through the lens (diffraction efficacy is nil). Preferably, the mirror is optically recorded for various angles of illumination (incident light). More generally, the design and setup of the holographic mirror is common knowledge for the skilled person.

The devices HMD of the invention are advantageous in that they protect confidentiality of the images visualized by the wearer wearing the device HMD, because the mirror is specific to the wavelength(s) used for illumination and visualization.

When the SLM is provided on a temple of the glasses/HMD, it is obviously off-center, and thus the projection of the holographic image by the SLM creates visual/optical aberrations, which can advantageously be at least partially compensated by a suitable modification of the holographic image data. The SLM thus modifies the wave front emitted (transmitted or reflected) by the SLM accordingly, leading to improved visual experience and comfort.

The present invention also pertains to the use of an SLM in a head-mounted device. More particularly, the invention pertains to the use of an SLM in eyeglasses, including prescription eyeglasses. The SLM can be a phase and/or amplitude spatial light modulator SLM, preferably a phase or phase-only SLM, for example an LCoS SLM or a Glass transmissive Active Matrix LC SLM.

The invention is illustrated by the following non-limiting examples.

EXAMPLES

Example 1: Display of the Map of a Metro Line

A myopic wearer is equipped with a device HMD of the invention. The wearer is allocated visualization parameter data VPD comprising prescription data PD (power for left and right eye) and device data HMDD corresponding to said device HMD. The visualization parameter data VPD are stored on a memory on said device HMD.

In one embodiment, the method of the invention can be implemented as follows, as illustrated at FIG. 1. A metro station is provided with a stand-alone terminal TERM comprising a light source LIGHT SOURC, a memory and a processor. Computer-generated holographic image data HD representing the map of a metro line are stored in the memory of the terminal TERM. The terminal TERM detects the presence of the wearer wearing the device HMD. This causes the transmission of the visualization parameter data VPD from the device HMD to the terminal TERM. The processor of the terminal performs a calculation step so as to provide modified holographic image data MHD, which are adapted to the wearer prescription data PD and to the device design HMDD. Said modified data MHD are then transmitted from the terminal TERM to the device HMD using Li-Fi communication.

In another embodiment, the method of the invention can be implemented as follows, as illustrated at FIG. 2. A metro station is provided with a stand-alone terminal TERM comprising a light source LIGHT SOURC, a memory and a processor. Computer-generated holographic image data HD representing the map of a metro line are stored in the memory of the terminal TERM. The terminal TERM detects the presence of the wearer wearing the device HMD. This causes the transmission of the holographic image data HD from the terminal TERM to the device HMD by Li-Fi. The device HMD is equipped with a processor which performs a calculation step so as to provide modified holographic image data MHD, which are adapted to the wearer prescription data PD and to the device design HMDD.

In both embodiments, the light source LIGHT SOURC of the terminal TERM emits a light beam suitable (arranged, configured) for causing the display of the modified holographic image of the metro line map, thus allowing the wearer to find orientation in the metro.

The wearer experiences augmented reality with personalized feature, since the display provides for correction of the holographic image as a function of the wearer prescription data.

Example 2: Display of Date/Time

An astigmatic wearer is equipped with a device HMD of the invention. The wearer has visualization parameter data VPD comprising prescription data PD (astigmatism modulus and axis for left and right eye) and device data HMDD corresponding to said device. The device HMD comprises a clock, a memory and a built-in light source LIGHT SOURC. The clock is suitable for providing date and time. The memory comprises modified holographic image data that take into account the wearer's astigmatism prescription data PD and device data HMDD. The holographic image data comprise digits 0, 1, 2, . . . , 9 and other alphanumerical characters such as slash, dash, etc. Following haptic command from the wearer and illumination by the light source LIGHT SOURC, the HMD causes the display of a holographic image of date and time, in the upper left hand corner of the wearer vision field, in the following format:

dd/mm/yy (day/month/year)

hh:mm (hours:minutes)

The HMD allows for the customization of the size of the fonts, of the location of the display (for example on the right-hand lower corner of the vision field), and of other display formats, such as hh:mm (am or pm) (hours:minutes).

Alternatively, the holographic image data may be those for the image of an actual clock with hands. The display of time and/or date is advantageously customized to the wearer, and provides for prescription-compliant display of time using personalized computer-generated holographic images. This example may be generalized to further embodiments where no terminal is required for performing the method of the invention.

Example 3: Display of Timetable of the Day

A presbyopic wearer is equipped with a device HMD of the invention. The wearer has visualization parameter data VPD comprising prescription data PD (left and right eye) and device data HMDD corresponding to said device. The device comprises a light source LIGHT SOURC.

The wearer is provided with a terminal TERM in the form of a tablet. The tablet is suitable (arranged, configured) for transmitting data to the device HMD. The tablet can be connected to the Internet and for example to a cloud via Wi-Fi communication. In one embodiment, the visualization parameter data VPD are stored on a memory on the HMD. The tablet can transmit to the device HMD a set of holographic image data HD representing the timetable of the wearer's day. The tablet detects the presence of the wearer, which causes the transmission of the data HD to the device HMD. The data HD are subsequently stored on the memory of the device (uploaded from the tablet) as such, can be modified by taking into account visualization data VPD, and may be also stored therein once modified to take into account the visualization data VPD.

Alternatively, in another embodiment, the tablet may comprise a memory storing the visualization parameter data VPD, and the tablet may be programmed to directly calculate and transmit modified data MHD instead of unmodified holographic image data HD to the device HMD.

For both embodiments, for the rest of the day, even when the wearer is 'off line', namely even if the HMD is not connected to a terminal or to a server, the wearer may access and display, as a holographic image, the time table data upon demand, for example following a haptic command. The display is possible upon illumination by the light source of the HMD. The display is advantageously customized to the presbyopia of the wearer. Updates of the data for the timetable are possible by connection to a suitable (arranged, configured) terminal connected to the relevant server or cloud.

Example 4: Possible Applications of the Methods and Systems of the Invention with Remote Light Sources Visiting a Museum Possible applications are in a museum, wherein a single light source LIGHT SOURC is part of a terminal TERM and may emit for the benefit of a wearer visiting the museum. Further, the light source LIGHT SOURC may emit in multiplex mode, so that it may be used for the benefit of a plurality of HMD wearers visiting the museum at the same time.

In a Vehicle

A terminal TERM equipped with a light source LIGHT SOURC may be set in a vehicle such as a car, motorbike, plane, truck. The terminal is for the display of information such as information about traffic, weather, etc. The information is displayed in a discrete, yet very visible fashion (as opposed to roads signs not always very visible by night or under difficult weather conditions such as rain or fog). The image is 'set' in the reference system of the vehicle, so that the driver needs not turn the head to watch for signs. Further, the light source may emit in multiplex mode and display other information for the benefit of another non-driving person in the vehicle.

Entering a Building

Building security (control of ins/outs) can be performed according to the invention. A terminal at the entrance allows the display of a virtual keyboard for entering an entrance code. Entering the building requires visitors to wear a suitable (arranged, configured) HMD.

The invention claimed is:

1. A computer-implemented method for the processing of computer-generated holographic phase-coded image data for display with a head-mounted computer-generated holographic image displaying device worn by a wearer, the computer-implemented method comprising:
   (i) a step of obtaining visualization parameter data comprising: wearer ophthalmic data including wearer prescription data and at least one of wearer eye sensitivity data and wearer ophthalmic biometry data;
   (ii) a step of obtaining the computer-generated holographic phase-coded image data which are coded by phase modulation;
   (iii) a step of calculating modified computer-generated holographic phase-coded image data from the computer-generated holographic phase-coded image data of step (ii) by taking into account the visualization parameter data of step (i);
   (iv) a step of providing the modified computer-generated holographic phase-coded image data of step (iii) to said device for display; and
   (v) a step of emitting, by at least one light source provided on a remote lighting terminal to which are transmitted said visualization parameter data, a light beam arranged for displaying the holographic image from the modified computer-generated holographic phase-coded image data of step (iii) by illumination of said device,
   wherein said at least one light source is further arranged to transmit data,
   wherein:
      step (ii) comprises a step of transmitting said computer-generated holographic image data from said at least one light source to said device, the illumination of said device being carried out after transmitting the computer-generated holographic image data from said light source to said device, or
      step (iv) comprises a step of transmitting said modified computer-generated holographic image data from said at least one light source to said device, the illumination of said device being carried out after transmitting the modified computer-generated holographic image data from said light source to said device, and
   wherein step (i) comprises:
      (i-a) a step of detecting, by said remote lighting terminal, the presence of said wearer provided with said device by a sensor which is a haptic command, and
      (i-b) responsive to the detected presence at step (i-a), a step of transmitting said visualization parameter data to said remote lighting terminal.

2. The computer-implemented method of claim 1, wherein
   said visualization parameter data are wearer prescription data selected from at least one of astigmatism module, astigmatism axis, power, prism and addition.

3. The computer-implemented method of claim 1, wherein at least one of said visualization parameter data of step (i) are stored in a memory on said device.

4. The computer-implemented method of claim 1, wherein at least one of said visualization parameter data of step (i) are stored in a wearer database on a communication server connected to said remote lighting terminal via a communication network, in association with a visualization parameter identifier which is an identifier that allows the retrieval of said visualization parameter data.

5. The computer-implemented method of claim 4, wherein step
   (i-b) comprises, responsive to the detected presence at step (i-a), the step of transmitting said visualization parameter data from said communication server to said remote lighting terminal.

6. The computer-implemented method of claim 5, wherein step (i) comprises:
   (i-c) a further step of transmitting visualization parameter data from said remote lighting terminal to said device.

7. The computer-implemented method of claim 4, wherein step (iv) comprises:
   a step of transmitting modified computer-generated holographic image data from said remote lighting terminal to said device.

8. The computer-implemented method of claim 7, wherein step (iv) comprises:
   a prior step of transmitting modified computer-generated holographic image data from said communication server to said remote lighting terminal.

9. The computer-implemented method of claim 1, wherein said computer-generated holographic phase-coded image data or said modified computer-generated holographic phase-coded image data are stored in an image database, wherein said method comprises a preliminary step of pre-registering, in said database, an association between a wearer identifier and said wearer, and wherein said computer-generated holographic phase-coded image data of step (ii) and/or said modified computer-generated holographic phase-coded image data of step (iii) are determined according to said wearer identifier.

10. The computer-implemented method of claim 9, wherein said computer-generated holographic phase-coded image data of step (ii) and/or said modified computer-generated holographic phase-coded image data of step (iii) are determined according to said wearer identifier in accordance with access rights.

11. A system for displaying a computer-generated holographic image for a wearer of a head-mounted computer-generated holographic image displaying device, the system comprising:

said head-mounted computer-generated holographic image displaying device; and at least one remote lighting terminal communicating with said head-mounted computer-generated holographic image displaying device and comprising:

a light source, a sensor which is arranged to detect presence of a wearer provided with said head-mounted computer-generated holographic image displaying device, and which is a haptic command, and a communication interface arranged to transmit, to said at least one remote lighting terminal, responsive to the detected presence of the wearer, visualization parameter data comprising wearer ophthalmic data including wearer prescription data and at least one of wearer eye sensitivity data and wearer ophthalmic biometry data, wherein said light source is arranged to transmit computer-generated holographic image data and modified computer-generated holographic image data from said remote lighting terminal, and afterwards to emit a light beam to illuminate said head-mounted computer-generated holographic image displaying device so as to display the holographic image.

12. The system according to claim 11, further comprising a plurality of said remote lighting terminals, each of which is connected to a lighting server via a lighting network.

13. The system according to claim 11, wherein said head-mounted computer-generated holographic image displaying device comprises a phase or phase and amplitude spatial light modulator made of LCoS (liquid crystal on silicon) or Glass transmissive Active Matrix Liquid Crystal.

14. The system according to claim 12, wherein said head-mounted computer-generated holographic image displaying device comprises a phase or phase and amplitude spatial light modulator made of LCoS (liquid crystal on silicon) or Glass transmissive Active Matrix Liquid Crystal.

15. The system according to claim 13, wherein said head-mounted computer-generated holographic image displaying device is wearer-prescription-compliant, being arranged to correct ametropia via said phase or phase and amplitude spatial light modulator.

\* \* \* \* \*